US010525353B2

(12) United States Patent
Lin et al.

(10) Patent No.: US 10,525,353 B2
(45) Date of Patent: Jan. 7, 2020

(54) METHOD, APPARATUS AND TERMINAL FOR DISPLAYING PROMPT INFORMATION

(71) Applicant: Tencent Technology (Shenzhen) Company Limited, Shenzhen (CN)

(72) Inventors: Jikai Lin, Shenzhen (CN); Zhidong Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 190 days.

(21) Appl. No.: 15/791,170

(22) Filed: Oct. 23, 2017

(65) Prior Publication Data

US 2018/0043261 A1 Feb. 15, 2018

Related U.S. Application Data

(63) Continuation-in-part of application No. PCT/CN2016/086268, filed on Jun. 17, 2016.

(30) Foreign Application Priority Data

Aug. 27, 2015 (CN) .......................... 2015 1 0536934

(51) Int. Cl.
*A63F 13/533* (2014.01)
*G07F 17/32* (2006.01)
(Continued)

(52) U.S. Cl.
CPC .......... *A63F 13/533* (2014.09); *A63F 13/493* (2014.09); *A63F 13/77* (2014.09);
(Continued)

(58) Field of Classification Search
None
See application file for complete search history.

(56) References Cited

U.S. PATENT DOCUMENTS

2014/0187318 A1* 7/2014 Gallizzi ................ A63F 13/355
463/31
2014/0349760 A1 11/2014 Tarama et al.
(Continued)

FOREIGN PATENT DOCUMENTS

| CN | 102460353 A | 5/2012 |
| CN | 103902804 A | 7/2014 |
| CN | 105363201 A | 3/2016 |

OTHER PUBLICATIONS

Tencent Technology, ISRWO, PCT/CN2016/086268, Sep. 21, 2016, 8 pgs.
(Continued)

*Primary Examiner* — Jason T Yen
(74) *Attorney, Agent, or Firm* — Morgan, Lewis & Bockius LLP

(57) ABSTRACT

A method for displaying prompt information is performed at a terminal having one or more processors, a touchscreen, and memory storing a plurality of programs to be executed by the one or more processors, the method including: acquiring current game progress information in a game process; acquiring, according to the game progress information, a track prompt file corresponding to the game progress information, the track prompt file being generated according to a game operation process of a historical game user; and displaying, based on the track prompt file, an operation prompt track on the touchscreen in a current game scene.

14 Claims, 4 Drawing Sheets

(51) Int. Cl.
*A63F 13/493* (2014.01)
*A63F 13/77* (2014.01)
*G06F 3/0488* (2013.01)

(52) U.S. Cl.
CPC ........ *G06F 3/04883* (2013.01); *G07F 17/326* (2013.01); *G07F 17/3209* (2013.01); *G07F 17/3211* (2013.01); *G06F 2203/04808* (2013.01)

(56) References Cited

U.S. PATENT DOCUMENTS

2015/0224403 A1* 8/2015 Hisaoka .............. A63F 13/2145
                   463/29
2015/0262617 A1* 9/2015 Jaime .................. G11B 27/034
                  386/241

OTHER PUBLICATIONS

Tencent Technology, IPRP, PCT/CN2016/086268, Feb. 27, 2018, 7 pgs.

* cited by examiner

METHOD, APPARATUS AND TERMINAL FOR DISPLAYING PROMPT INFORMATION

RELATED APPLICATIONS

This application is a continuation-in-part of PCT/CN2016/086268, entitled "PROMPT INFORMATION DISPLAY METHOD, APPARATUS AND TERMINAL" filed on Jun. 17, 2016, which claims the benefit of Chinese Patent Application No. 201510536934.1, filed with the State Intellectual Property Office of the People's Republic of China on Aug. 27, 2015, and entitled "PROMPT INFORMATION DISPLAY METHOD, APPARATUS AND TERMINAL", which is incorporated by reference in its entirety.

FIELD OF THE TECHNOLOGY

The present disclosure relates to the field of terminal technologies, and in particular, to a method, an apparatus and a terminal for displaying prompt information.

BACKGROUND OF THE DISCLOSURE

In the field of games, in order to enable game novices to grasp a game quickly, most games may provide prompt information for guiding users how to play the games, such as a game tutorial. When a user opens a game for the first time, the game tutorial may prompt the user to press a key to implement a function through an arrow at an opportune moment. In order to improve a game user's game skills, some advanced prompt information, such as a video tutorial, may also be provided. Some veteran game users make a video tutorial according to their own operations of passing levels, and share it with other game users to assist in passing levels.

However, the prompt information such as a game tutorial can only explain basic operation functions of a game to game novice, which lacks correlation and has no guidance to passing levels of the game. Although the prompt information such as a video tutorial cam guide users to pass levels, it also has some shortcomings, for example, a user's fingers may block part of the screen, and the user cannot see clearly the game itself and the operation of a player's fingers, which leads to poor guidance of the prompt information.

SUMMARY

To solve the problems in the technology, embodiments of the present application provide a method, an apparatus and a terminal for displaying prompt information. The technical solutions are as follows:

In one aspect, a method for displaying prompt information is provided, the method including:

acquiring current game progress information in a game process;

acquiring, according to the game progress information, a track prompt file corresponding to the game progress information, the track prompt file being generated according to a game operation process of a historical game user; and displaying, based on the track prompt file, an operation prompt track on the touchscreen in a current game scene.

In another aspect, an apparatus for displaying prompt information is provided, the apparatus including:

a progress acquisition module configured to acquire current game progress information in a game process;

a prompt file acquisition module configured to acquire, according to the game progress information, a track prompt file corresponding to the game progress information, the track prompt file being generated according to a game operation process of a historical game user; and a display module configured to display, based on the track prompt file, an operation prompt track on the touchscreen in a current game scene.

In a further aspect, a terminal is provided, including:

one or more processors; and a memory;

the memory storing one or more programs, the one or more programs being configured to be executed by the one or more processors, and the one or more programs including instructions for performing the following operations:

acquiring current game progress information in a game process;

acquiring, according to the game progress information, a track prompt file corresponding to the game progress information, the track prompt file being generated according to a game operation process of a historical game user; and displaying, based on the track prompt file, an operation prompt track on the touchscreen in a current game scene.

The technical solutions provided in the embodiments of the present application bring about the following beneficial effects:

In a game process, a track prompt file generated by an actual operation track of a historical game user is acquired, and an operation prompt track indicated by the track prompt file is displayed in a current game scene based on the track prompt file, the operation prompt track having strong guidance, so that the game user can imitate an operation like calligraphy and copying practice as displayed according to the operation prompt track without too much learning cost, which greatly improves the guidance of prompt information in a game process.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

DESCRIPTION OF EMBODIMENTS

To make the objectives, technical solutions and advantages of the present disclosure clearer, embodiments of the present application are described below in further detail with reference to the accompanying drawings.

Figure 1:
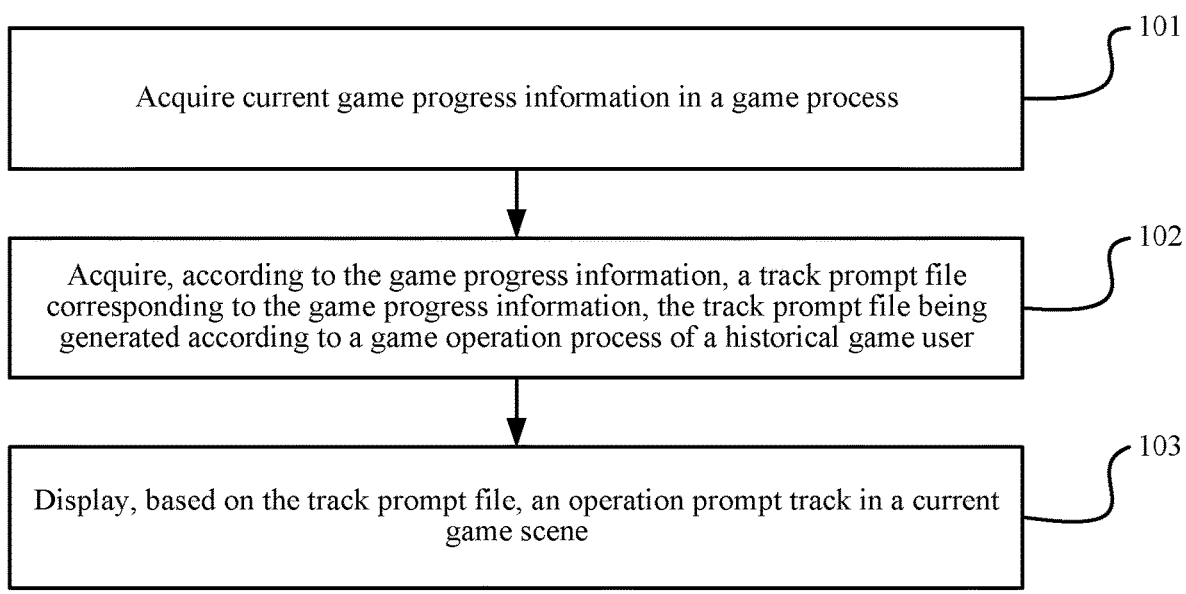
FIG. 1 is a flowchart of a method for displaying prompt information according to an embodiment of the present application.

FIG. 1 is a flowchart of a method for displaying prompt information according to an embodiment of the present application. Referring to FIG. 1, the method includes:

101: Acquire current game progress information in a game process.

102: Acquire, according to the game progress information, a track prompt file corresponding to the game progress information, the track prompt file being generated according to a game operation process of a historical game user.

103: Display, based on the track prompt file, an operation prompt track on the touchscreen in a current game scene.

In some embodiments, the operation prompt track includes at least one line for indicating an operation track of a touch operation on the touchscreen and at least one designated mark for indicating a stay duration of the touch operation.

In some embodiments, after the displaying, based on the track prompt file, an operation prompt track on the touchscreen in a current game scene, the method further includes:

acquiring an operation track of a touch operation of a current game user;

judging whether the operation track of the touch operation overlaps with the operation prompt track, and not displaying an overlapping part if yes; and displaying, according to a stay duration of the current game user on the designated mark, a gradient effect of the designated mark, and not displaying the designated mark when the stay duration reaches the stay duration indicated by the designated mark.

In some embodiments, models of lines in different game scenes are different; and/or sizes of designated marks with different significance are different.

In some embodiments, the displaying, based on the track prompt file, an operation prompt track on the touchscreen in a current game scene includes:

parsing the track prompt file to obtain a track function; and drawing, according to the track function, the operation prompt track on a game layer of the current game scene.

All the above optional technical solutions can form optional embodiments of the disclosure in any combination, which are not repeated herein one by one.

Figure 2:
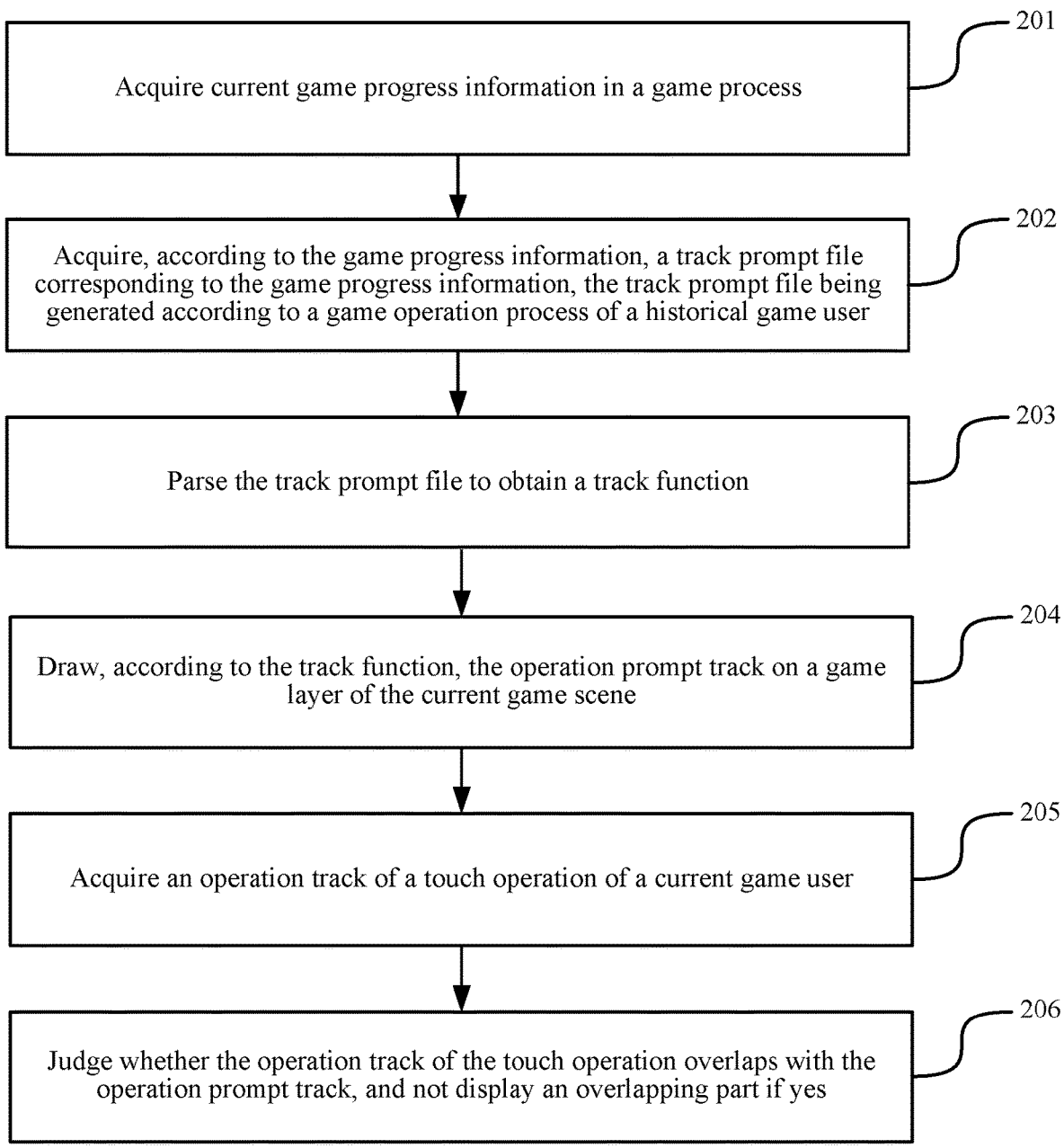
FIG. 2 is a flowchart of a method for displaying prompt information according to an embodiment of the present application.

FIG. 2 is a flowchart of a method for displaying prompt information according to an embodiment of the present application. FIG. 2 is a schematic embodiment of the present disclosure. Referring to FIG. 2, the embodiment specifically includes:

201. Acquire current game progress information in a game process.

In the embodiment of the present application, the game progress information may refer to information for indicating a current stage of a game, such as a game level identification and a game instance identification. The game level identification may be used for indicating a level in a game, and the game instance identification may be used for indicating an instance scene in the game.

When a terminal is in a game process, that is, the terminal has run a game application, a step of acquiring game progress information may be triggered through a prompt information acquisition option provided by the game application, to perform operation 202 based on the game progress information. It should be noted that operation 201 may be performed at any stage of the game process. For example, in a game level, the game level identification is acquired when the operation of triggering the prompt information acquisition option is detected. For another example, during running of a game instance, the game instance identification is acquired when the operation of triggering the prompt information acquisition option is detected.

202. Acquire, according to the game progress information, a track prompt file corresponding to the game progress information.

In the embodiment of the present application, the track prompt file is generated according to a game operation process of a historical game user. A specific generation process may be as follows: firstly, collecting touch operations of the historical game user in a game process, the touch operations including sliding operations and click operations, and recording occurrence time of each touch operation while collecting the touch operations; secondly, generating a prompt track according to the collected touch operations, the prompt track including lines converted from the sliding operations and points converted from the click operations; next, generating a track function from the prompt track and the occurrence time of each touch operation; and finally, generating a track prompt file according to the track function.

It should be noted that the track function may only be a function for indicating a touch operation track in a game process, and may also be a function including a specific effect parameter, which is not specifically limited in the embodiment of the present application. Certainly, after parsing, the terminal may display either of the two functions by using a track performance effect set by itself. The specific effect parameter may include color, transparency, animation, line poundage and the like, which is not specifically limited in the embodiment of the present application.

In addition, the track prompt file may be made by the game user himself/herself. The game application may provide a corresponding making function, so that, after the making function is opened, the above specific generation process may be performed and uploaded by the game user to a game server. Certainly, it is also possible that a game server administrator acquires a track prompt file and then stores the track prompt file to the game server, which is not limited in the embodiment of the present application. If the generation process is performed at a terminal side, the volume of data of a track file generated is relatively small, and the track file may be further dynamically configured according to setting of the server, for example, some display effects are configured and so on. It may be seen as an implementation mode similar to a lyrics file, which may not affect application running on the terminal.

The game server may prompt the game user to make a track prompt file according to a specific game condition of the game user, for example, the game server may acquire the number of levels passed by each game user, determine game users in preset top rankings in descending order of the number of levels passed, and send making prompt information to the game users in preset top rankings. Certainly, to acquire a track prompt file with more guidance, the game server may further acquire, for different game levels, scores of game users in the game levels, determine game users in preset top rankings in descending order of the scores, and send making prompt information about the game levels to the game users in preset top rankings. Different game instances may also be prompted in the above manner.

Further, to encourage the game user to make and provide a track prompt file, stimulus information may be issued to the game user according to the number of track prompt files made by the game user. The stimulus information may be points, a virtual item or a platform activity privilege. Certainly, the stimulus information may also be issued according to feedback information such as scores of other game users for track prompt files made by the game user. For example, for a track prompt file, statistics is conducted on scores of game users using the track prompt file, and stimulus information is issued according to the scores.

In the embodiment of the present application, the acquisition process may be performed through interaction with the game server, and may also be acquired from multiple track prompt files downloaded by the terminal. The two situations are described below respectively:

By taking acquisition through interaction with the game server as an example, the terminal may send game progress information to the game server, the game server acquires, according to the game progress information, a track prompt file corresponding to the game progress information from a prompt file database at a server side, and sends the track prompt file to the terminal, and the terminal performs the subsequent parsing process. Further, the game server may be a server serving multiple games. Therefore, when sending the game progress information, the terminal may also send a game identification for uniquely identifying the game, such that the game server can acquire a track prompt file in the game corresponding to the game progress information according to the game identification and the game progress information, to improve query accuracy.

By taking acquisition from multiple track prompt files downloaded by the terminal, when installing the game application or running the game application, the terminal may actively download a track prompt file of the game from the game server and store the track prompt file in a storage path corresponding to the game application, so that the track prompt file is directly read and parsed from the storage path in subsequent use, which greatly improves the speed of acquiring the track prompt file and can also avoid problems such as a delayed prompt caused by bad network conditions. The downloading process may be performed when the terminal has been connected to the Internet, such as the terminal is connected to a Wi-Fi hotspot, which is not limited in the embodiment of the present application.

203. Parse the track prompt file to obtain a track function.

The embodiment of the present application makes no limitations to a specific file format of the track prompt file. The specific file format may be determined by the game server, and the game application only needs to have a capability of parsing the track prompt file.

It should be noted that the track function is a function that takes time as a variable, for indicating lines and points varying with changes in time. For example, the track function may be an expression in the following form:

time [h:m:s]+form[point/line]+position[x,y]+transparency [percentage].

To describe function expressions for the points and the lines more clearly, examples are given below respectively:

Drawing of the points may be in the following form of expression:

Point 1: [00:00:81] point (0,0) 50%
Point 2: [00:01:81] point (1,1) 50%
Point 3: [00:02:81] point (2,2) 50%

Drawing of the lines may employ a manner of determination with endpoints. Endpoints of the lines may be in the following form of expression:

Endpoint 1: [00:00:123] line (0,0) 80%
Endpoint 2: [00:01:123] line (1,1) 80%
Endpoint 3: [00:02:123] line (2,2) 80%

It should be noted that the above example is only a simple example of the track function, but is not used to limit its specific expression.

204. Draw, according to the track function, the operation prompt track on a game layer of the current game scene.

A game engine may draw an operation prompt track on a game layer while drawing a game scene according to the track function, the operation prompt track including at least one line for indicating an operation track of a touch operation on the touchscreen and at least one designated mark for indicating a stay duration of the touch operation. In some embodiments, the designated mark may be a circular mark. Certainly, the designated mark may also have other shapes, which is not specifically limited in the embodiment of the present application.

Further, when the operation prompt track is drawn, it is possible to draw, according to a background color of the game scene itself, the operation prompt track in a color different from the background color, so that the game user can identify the displayed operation prompt track clearly. For different game scenes, operation prompt tracks in different colors may be drawn, and certainly, models of lines in the different game scenes may also be different.

When which color is determined to be used to draw the operation prompt track, main colors in the background color of the game scene itself may also be acquired. The main colors may refer to colors whose proportions in the background color exceed a designated proportion, and a color whose color difference between the main colors is greater than a preset value may be determined as the color of the track. The preset value may be set by a server, and may also be adjusted by the game user in use, which is not limited in the embodiment of the present application. Through determination of the color, the difference between the drawn operation prompt track and the background color can be identified by human eyes, achieving a more outstanding prompt effect.

Moreover, for the designated mark in the operation prompt track, sizes of designated marks with different significance are different. If an operation is a key operation, the size of the designated mark may be set as greater than a preset size. The size and line model of the designated mark may be set by the terminal, may also be set by the server, and may certainly be set by a game user generating the track file, which is not specifically limited in the embodiment of the present application.

Figure 3A:
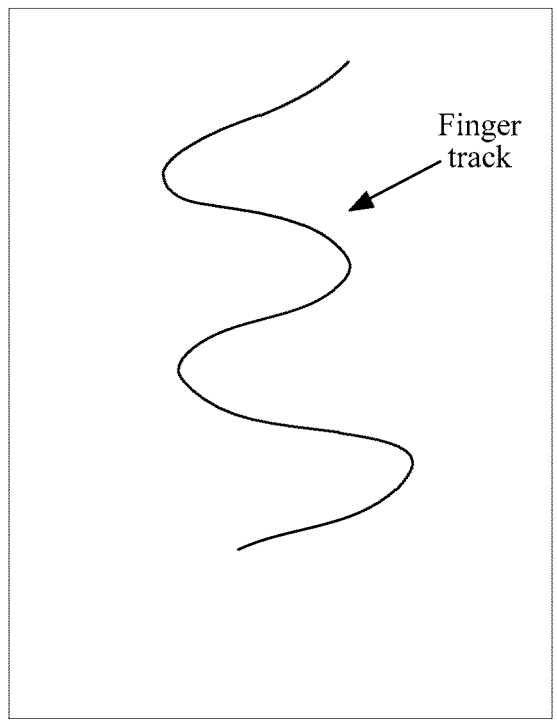
FIG. 3A is a schematic diagram of an operation prompt track according to an embodiment of the present application.
Figure 3B:
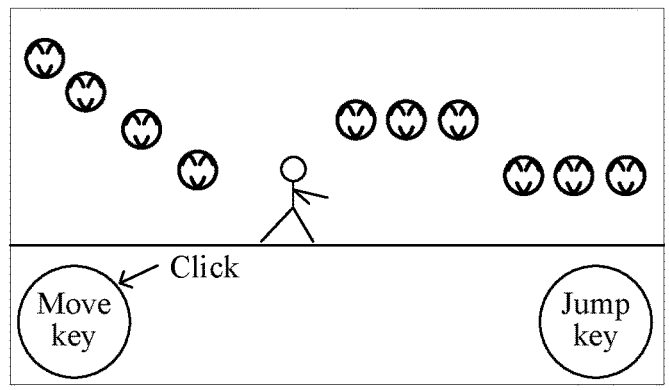
FIG. 3B is a schematic diagram of an operation prompt track according to an embodiment of the present application.
Figure 3C:
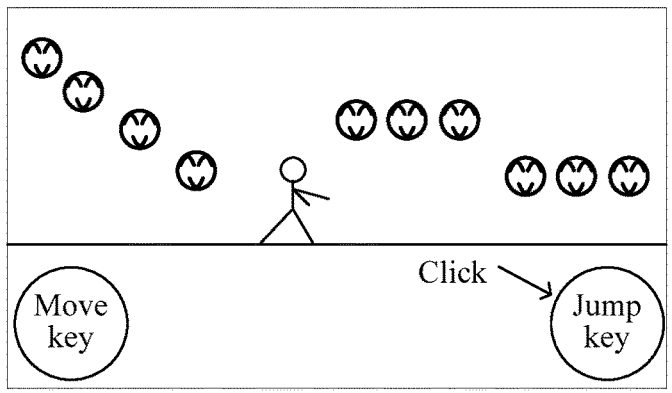
FIG. 3C is a schematic diagram of an operation prompt track according to an embodiment of the present application.

An operation prompt track may be divided into multiple lines and multiple designated marks. As shown in FIG. 3A, the operation prompt track may include multiple lines. As shown in FIG. 3B and FIG. 3C, the operation prompt track may also include multiple designated marks. To prompt a user to perform an operation indicated by the operation prompt track at a designated moment, it is also possible to highlight a line or designated mark corresponding to the operation near occurrence time of the operation, to play a role of prompt. The highlight includes, but is not limited to, flickering the line or designated mark at a preset frequency, displaying the line or designated mark in a designated color and so on. Further, the operation prompt track may also include some operation prompt information, for example, add some guiding arrow marks or text information around the line or designated mark, such as "finger track", "please click" and "please press", so that the user knows a specific use manner of the operation prompt track.

205. Acquire an operation track of a touch operation of a current game user.

The operation track of the touch operation may be obtained by collecting actual operations of the user by a game engine.

206. Judge whether the operation track of the touch operation overlaps with the operation prompt track, and not display an overlapping part if yes.

In operations 205-206, in the game process of the current game user, operation tracks that have been implemented may not be displayed any more according to an operation track of actual touch operations of the user. Therefore, actual operations of the current game user may be detected in real time to acquire an operation track of touch operations of the current game user. If the tracks overlap, it may be considered that the current game user has implemented the operation of the overlapping part, and the overlapping part may not be displayed any more, to avoid interfering with subsequent operations of the user.

Certainly, in another embodiment of the present application, to avoid that the track displayed on the terminal screen is too complicated, an old track may be cleared every preset duration. The old track may refer to a track whose display duration exceeds the preset duration.

Further, to effectively play a role of guidance, as the designated mark is a mark having a display area, reduction of the area of the designated mark may be used as a gradient effect, so that the designated mark can gradually become small with stay of the touch operation of the user, to prompt the user when a pressing operation should be stopped to perform next operation. Therefore, according to the embodiment of the present application, in a game process, a gradient effect of the designated mark may also be displayed according to a stay duration of the current game user on the designated mark, and the designated mark is not displayed when the stay direction reaches the stay duration indicated by the designated mark. In addition, an operation time progress bar may also be displayed for the designated mark. The operation time progress bar may be used for indicating duration of a pressing operation, to prompt the user when the pressing operation should be stopped.

According to the method in the embodiment of the present application, in a game process, a track prompt file generated by an actual operation track of a historical game user is acquired, and an operation prompt track indicated by the track prompt file is displayed in a current game scene based on the track prompt file, the operation prompt track having strong guidance, so that the game user can imitate an operation like calligraphy and copying practice as displayed according to the operation prompt track without too much learning cost, which greatly improves the guidance of prompt information in a game process.

Further, by integrating advantages of the prompt mode and the video tutorial, the user can simply know a specific position of the screen to be clicked or slid and the time to click or slide the position, duration that each operation should last specifically and so on, which greatly enhances objectivity and learnability of the user and solves limitations of learning passing of levels by the user through video.

As the operation prompt track is an abstracted player action and factors that may affect display of the tutorial such as fingers of players making the tutorial may not appear like the video tutorial, for some terminals with relatively small screen sizes, guidance of the prompt information is greatly improved, and the defects caused in a scene where sizes of the terminal screens are relatively small are solved.

Figure 4:
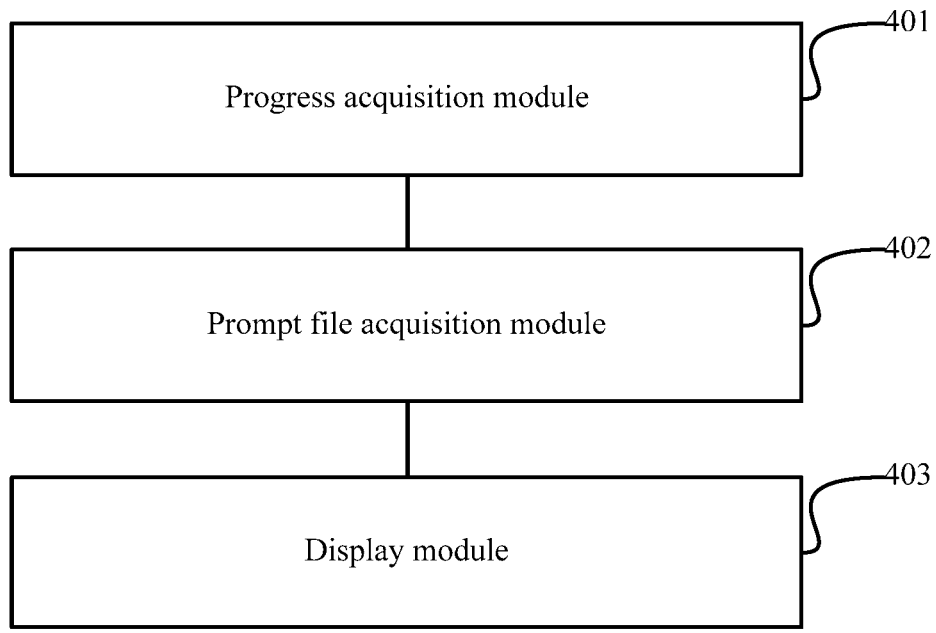
FIG. 4 is a schematic structural diagram of an apparatus for displaying prompt information according to an embodiment of the present application.

FIG. 4 is a schematic structural diagram of an apparatus for displaying prompt information according to an embodiment of the present application. Referring to FIG. 4, the apparatus includes:

a progress acquisition module 401 configured to acquire current game progress information in a game process;

a prompt file acquisition module 402 configured to acquire, according to the game progress information, a track prompt file corresponding to the game progress information, the track prompt file being generated according to a game operation process of a historical game user; and a display module 403 configured to display, based on the track prompt file, an operation prompt track on the touchscreen in a current game scene.

In some embodiments, the operation prompt track includes at least one line for indicating an operation track of a touch operation on the touchscreen and at least one designated mark for indicating a stay duration of the touch operation.

In some embodiments, the apparatus further includes:

a track acquisition module configured to acquire an operation track of a touch operation of a current game user;

a judgment module configured to judge whether the operation track of the touch operation overlaps with the operation prompt track, and trigger the display module not to display an overlapping part if yes; and the display module further configured to display, according to a stay duration of the current game user on the designated mark, a gradient effect of the designated mark, and not display the designated mark when the stay duration reaches the stay duration indicated by the designated mark.

In some embodiments, models of lines in different game scenes are different; and/or sizes of designated marks with different significance are different.

In some embodiments, the display module is configured to parse the track prompt file to obtain a track function; and draw, according to the track function, the operation prompt track on a game layer of the current game scene.

It should be noted that the above functional modules are only described for exemplary purposes when the apparatus for displaying prompt information provided by the foregoing embodiments displays the prompt information. In actual applications, the functions may be allocated to different functional modules according to specific needs, which means that the internal structure of the apparatus is divided into different functional modules to complete all or some of the above described functions. In addition, the apparatus for displaying prompt information provided by the foregoing embodiments is based on the same concept as the method for displaying prompt information provided by the foregoing embodiments. For the specific implementation process, refer to the method embodiments, and the details are not described herein again.

Figure 5:
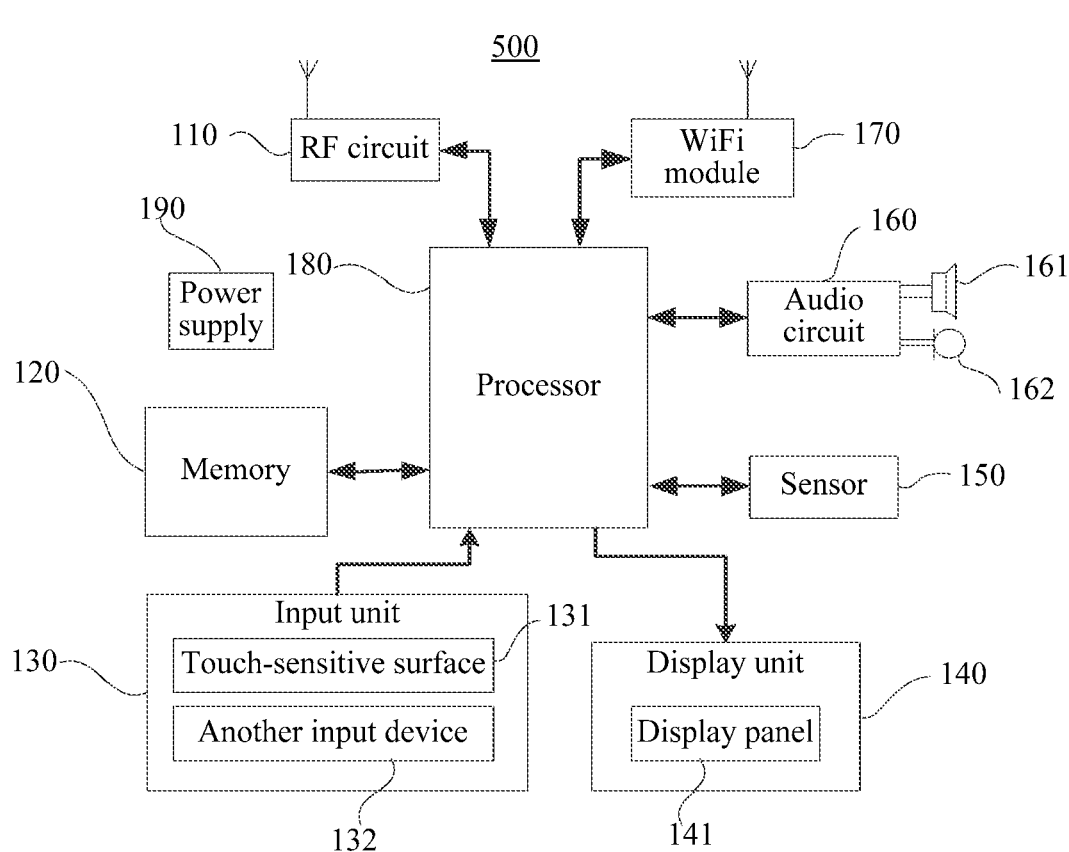
FIG. 5 is a block diagram of a terminal according to an embodiment of the present application.

This embodiment provides a terminal. The terminal may be configured to perform the method for displaying prompt information provided in the foregoing embodiments. Referring to FIG. 5, the terminal 500 includes:

The terminal 500 may include components such as a Radio Frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art may understand that the structure of the terminal structure shown in FIG. 5 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, when the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a Low Noise Amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 500, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. In some embodiments, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 500. The graphical user interfaces may be formed by a graph, a text, an icon, a video, or any combination thereof. The display unit 140 may include a display panel 141. In some embodiments, the display panel 141 may be configured by using a Liquid Crystal Display (LCD), an Organic Light-Emitting Diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal 500 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 500 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 500, are not further described herein.

The audio circuit 160, a loudspeaker 161, and a microphone 162 may provide audio interfaces between the user and the terminal 500. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 500.

WiFi is a short distance wireless transmission technology. The terminal 500 may help, by using the WiFi module 170, the user to receive and send e-mails, browse a webpage, access streaming media, and so on, which provides wireless broadband Internet access for the user. Although FIG. 5 shows the WiFi module 170, it may be understood that the WiFi module is not a necessary component of the terminal 500, and when required, the WiFi module may be omitted as long as the scope of the essence of the present disclosure is not changed.

The processor 180 is the control center of the terminal 500, and is connected to various parts of the mobile phone by using various interfaces and lines. By running or executing the software program and/or module stored in the memory 120, and invoking data stored in the memory 120, the processor 180 performs various functions and data processing of the terminal 500, thereby performing overall monitoring on the mobile phone. In some embodiments, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 500 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 500 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs contain instructions used for implementing the instructions of operations at a terminal side in the embodiment shown in FIG. 1 or FIG. 2.

A person of ordinary skill in the art may understand that all or some of the operations of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

In an exemplary embodiment, a non-transitory computer readable storage medium including instructions, for example, a memory including instructions, is further provided. The instructions may be executed by a processor of the terminal to implement the method for displaying prompt information in the following embodiment. For example, the non-transitory computer readable storage medium may be a read-only memory (ROM), a random access memory (RAM), a compact disc read-only memory (CD-ROM), a magnetic tape, a floppy disk, an optical data storage device, and the like.

The foregoing descriptions are merely preferred embodiments of the present application, but are not intended to limit the present disclosure. Any modification, equivalent replacement, or improvement made within the spirit and principle of the present disclosure shall fall within the protection scope of the present disclosure.

What is claimed is:

1. A method for displaying prompt information performed at a terminal having one or more processors, a touchscreen, and memory storing a plurality of programs to be executed by the one or more processors, the method comprising:

acquiring current game progress information in a game process;

acquiring, according to the game progress information, a track prompt file corresponding to the game progress information, the track prompt file being generated according to a game operation process of a historical game user; and displaying, based on the track prompt file, an operation prompt track on the touchscreen in a current game scene, further including:

acquiring, in the operation prompt track, at least one line for indicating an operation track of a touch operation of a current game user on the touchscreen and at least one designated mark for indicating a stay duration of the touch operation;

judging whether the operation track of the touch operation overlaps with the operation prompt track; and displaying, according to the stay duration of the current game user on the designated mark, a gradient effect of the designated mark.

2. The method according to claim 1, wherein a portion of the operation prompt track that overlaps with the operation track of the touch operation is removed from the touchscreen.

3. The method according to claim 1, wherein the designated mark is removed from the touchscreen when the stay duration of the current game user on the designated mark reaches a predefined threshold.

4. The method according to claim 1, wherein models of lines in different game scenes are different; and sizes of designated marks with different significance are different.

5. The method according to claim 1, wherein the operation of displaying, based on the track prompt file, an operation prompt track on the touchscreen in a current game scene comprises:

parsing the track prompt file to obtain a track function; and drawing, according to the track function, the operation prompt track on a game layer of the current game scene.

6. A terminal, comprising:

one or more processors;

a touchscreen;

memory; and one or more programs stored in the memory, wherein the one or more programs are configured to be executed by the one or more processors to cause the terminal to perform a plurality of operations including:

acquiring current game progress information in a game process;

acquiring, according to the game progress information, a track prompt file corresponding to the game progress information, the track prompt file being generated according to a game operation process of a historical game user; and displaying, based on the track prompt file, an operation prompt track on the touchscreen in a current game scene, further including:

acquiring, in the operation prompt track, at least one line for indicating an operation track of a touch operation of a current game user on the touchscreen and at least one designated mark for indicating a stay duration of the touch operation;

judging whether the operation track of the touch operation overlaps with the operation prompt track; and displaying, according to the stay duration of the current game user on the designated mark, a gradient effect of the designated mark.

7. The terminal according to claim 6, wherein a portion of the operation prompt track that overlaps with the operation track of the touch operation is removed from the touchscreen.

8. The terminal according to claim 6, wherein the designated mark is removed from the touchscreen when the stay duration of the current game user on the designated mark reaches a predefined threshold.

9. The terminal according to claim 6, wherein models of lines in different game scenes are different; and sizes of designated marks with different significance are different.

10. The terminal according to claim 6, wherein the operation of displaying, based on the track prompt file, an operation prompt track on the touchscreen in a current game scene comprises:
    parsing the track prompt file to obtain a track function; and
    drawing, according to the track function, the operation prompt track on a game layer of the current game scene.

11. A non-transitory computer readable storage medium in connection with a terminal having one or more processors and a touchscreen, the storage medium storing one or more programs, wherein the one or more programs are configured to be executed by the one or more processors to cause the terminal to perform a plurality of operations including:
    acquiring current game progress information in a game process;
    acquiring, according to the game progress information, a track prompt file corresponding to the game progress information, the track prompt file being generated according to a game operation process of a historical game user; and
    displaying, based on the track prompt file, an operation prompt track on the touchscreen in a current game scene, further including:
        acquiring, in the operation prompt track, at least one line for indicating an operation track of a touch operation of a current game user on the touchscreen and at least one designated mark for indicating a stay duration of the touch operation;
        judging whether the operation track of the touch operation overlaps with the operation prompt track; and
        displaying, according to the stay duration of the current game user on the designated mark, a gradient effect of the designated mark.

12. The non-transitory computer readable storage medium according to claim 11, wherein a portion of the operation prompt track that overlaps with the operation track of the touch operation is removed from the touchscreen.

13. The non-transitory computer readable storage medium according to claim 11, wherein the designated mark is removed from the touchscreen when the stay duration of the current game user on the designated mark reaches a predefined threshold.

14. The non-transitory computer readable storage medium according to claim 11, wherein models of lines in different game scenes are different; and sizes of designated marks with different significance are different.

* * * * *